United States Patent Office 3,189,437
Patented June 15, 1965

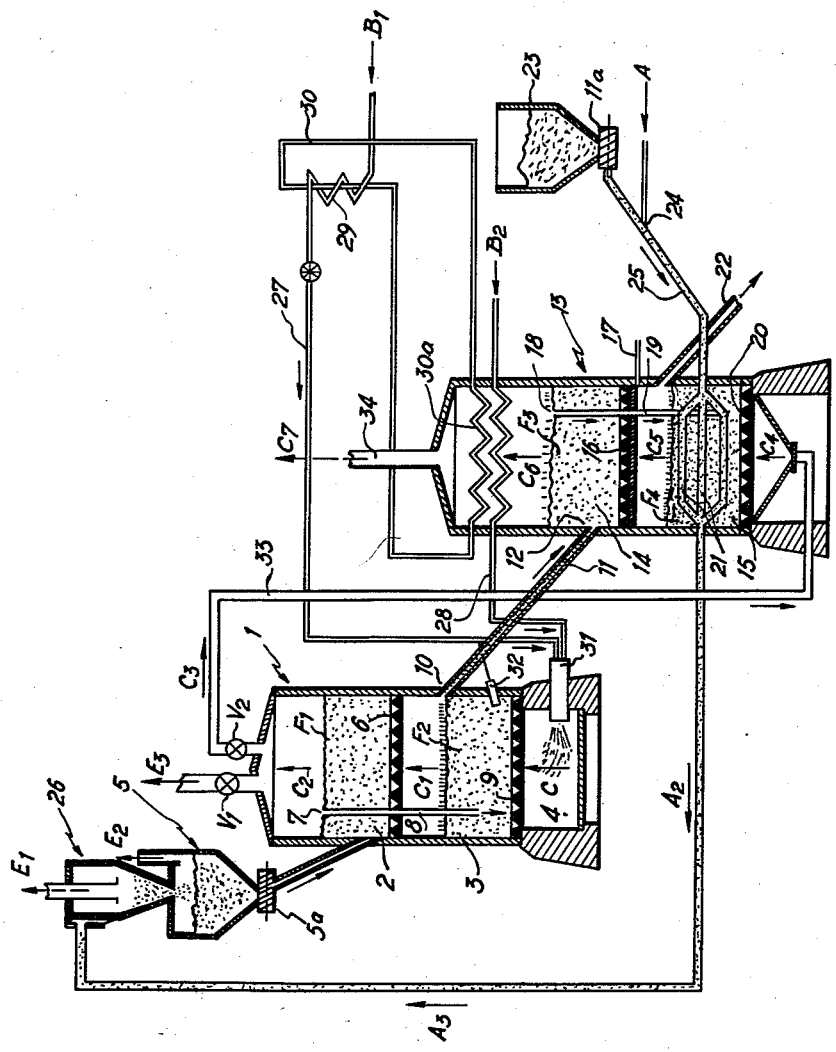

3,189,437
PROCESS FOR ROASTING BY FLUIDIZATION, MORE PARTICULARLY FOR MAGNETIZING ROASTING
Michel Boucraut, Metz, France, assignor to Institut de Recherches de la Siderurgie Francaise, Saint Germain-en-Laye, France, a professional institution governed by French law
Filed June 14, 1963, Ser. No. 287,999
Claims priority, application France, July 5, 1962, 903,020
12 Claims. (Cl. 75—9)

The present invention relates to improvements in processes for roasting by fluidization, more particularly for magnetizing roasting.

It is commonly considered that the process of magnetizing roasting represents a financial burden on account of the heavy consumption of power which is necessary for the purpose of dehydrating, decarbonating and roasting the ore, and which is mostly removed in the form of sensible heat by the materials which are processed as well as by the smokes and cannot be recovered to any appreciable extent by conventional methods and devices. Accordingly, the consumption of heat frequently amounts to 350 to 400 therms and even 500 therms per ton of ore when conventional processes are employed.

The main object of the present invention is to make it possible to carry out the magnetizing roasting of iron ores under improved conditions of power consumption and of control of reactions.

To this end, the present invention contemplates improvements in processes for the roasting of ore, more especially for magnetizing roasting by fluidization in a number of steps, each step being carried out in a separate fluidization bed, which consist in that there is carried out a first series of steps consisting of a roasting of the ore which is preceded if necessary by a dehydrating heating, the ore being fluidized by a first stream of smokes or hot gases, there being then carried out a second series of steps consisting of a reduction of the ore in a fluidized bed in which reducing products are introduced, and a cooling step during which at least a part of the sensible heat of the ore which passes out is transferred to a second stream of fluidization gas for said second series of steps, said second stream of fluidization gas being formed by at least a part of the smokes or hot gases derived from the first series of steps, while the rate of flow, the temperature and chemical composition of the two fluidization streams are adjusted separately.

In accordance with a further characteristic feature of said process four steps are utilized for the fluidization, the first two steps being carried into effect by subjecting the ore successively to a dehydrating heating process in a first fluidized bed and to a roasting process in a second fluidized bed, the ore being fluidized by a first stream of smokes or hot gases which circulate from the second to the first fluidized bed, whereupon the third and fourth steps are carried into effect by performing successively a reduction of the ore in a third fluidized bed in which the reducing products are introduced, and a cooling treatment in a fourth fluidized bed in which at least a part of the sensible heat of the ore which passes out is transferred to a second stream of fluidization gas which circulates from the fourth to the third fluidized bed, the second stream of fluidization gas being then constituted by at least a part of the smokes or hot gases which pass out of the first fluidized bed, and the rate of flow, the temperature and the chemical composition of the two fluidization streams are adjusted separately.

The reducing products which are injected in the third fluidized bed can be products of decomposition of a low-boiling gasoline. The reducing products can be obtained by injecting the low-boiling gasoline directly into the third fluidized bed. It is possible to transfer a part of the sensible heat of the discharged ore to fresh ore which is supplied to the first fluidized bed. Similarly, at least a part of the discharged gases and smokes can be used for the purpose of preheating the air and the fuel which are employed in a furnace for generating smokes and hot gases so as to constitute the first fluidization stream.

Finally, the oxidation of the ore can be finished during the roasting stage by ensuring the presence of oxygen in the gases and smokes which fluidize the bed in which the roasting process is carried out.

It will be understood that by carrying out the process in accordance with the invention step by step through the successive stage of separate reactors, it is possible to obtain better metallurgical results while at the same time achieving an economy in power consumption.

The use of the fluidization process permits of easy control of the composition of the gases and the achievement of perfect uniformity of temperatures which, in conjunction with the complete oxidation of the ore during the roasting process, guarantees uniformity of results.

Furthermore, by making use of the gases in accordance with the invention in the direction of roasting to reduction, a gas having a high thermal level is provided at the input of the roasting step, thereby resulting in an efficiency which is higher than that of conventional processes and devices in which the gases circulate in the direction of reduction to roasting and have a low thermal level when admitted to the roasting step.

In addition, in the case in which it is intended to make use of a liquid fuel and a low-boiling gasoline respectively for the heating and the reduction, an installation which is constructed in accordance with the invention will be independent of coal sources and will make it possible to carry out in situ the magnetizing roasting process followed by the beneficiation of the ore in a mine which is located far away from any metallurgical plant.

The present invention will be illustrated by one example of practical application which is not given in any sense by way of limitation and which will be described below with reference to the accompanying drawings, the single figure of which illustrates diagrammatically a magnetizing roasting installation designed for continuous operation in accordance with the invention.

A roasting reactor which is designated by the reference 1 comprises two stages 2 and 3 in which there are respectively carried out a dehydrating heating process in a fluidization bed $F_1$ and a total decarbonating and oxidation roasting process in a fluidization bed $F_2$. A stream C, $C_1$, $C_2$ of hot gases derived from a combustion chamber 4 fluidizes the ore in the beds $F_2$ and $F_1$. In the said reactor 1, the ore which is in the powdered or granular state as supplied from a hopper 5 and distributed by a screw-type feeder 5a is fluidized at $F_1$ above the grid 6. The hot and partially dehydrated ore passes through the top opening 7 of a vertical pipe 8 up to the vicinity of the fluidization grid 9 of the lower stage above which said ore is fluidized at $F_2$.

The roasted and completely oxidized ore passes through the top opening 10 of a discharge pipe 11 up to 12 into a reduction reactor 13 comprising two stages 14 and 15 in which are respectively carried out the magnetizing reduction and the recovery of sensible heat of the ore in the fluidization beds $F_3$ and $F_4$. A stream $C_4$, $C_5$, $C_6$ of hot gases derived from the first reactor fluidizes the ore in the beds $F_4$ and $F_3$. In the said reactor 13, the roasted ore which is derived from the lower stage of the first reactor is admitted at 12 in the vicinity of a fluidization grid 16 above which said roasted ore is fluidized at $F_3$. Low-boiling gasoline which is fed in at 17 arrives in the fluidized bed $F_3$ through the fluidization grid 16. Said low-boiling gasoline decomposes when passing into the fluidized bed, the temperature of which is high and the decomposition products constitute the ore-reducing materials. The reduced ore passes through the top opening 18 of a vertical pipe 19 up to the vicinity of a fluidization grid 20 in the lower stage above which said reduced ore is fluidized at $F_4$. The lower stage 15 constitutes a heat recuperator. A nest of tubes 21 passes in fluid-tight manner through said stage and provides for a circulation through the fluidization bed $F_4$ in which a substantial proportion of the sensible heat of the ore is yielded partly to fresh ore which is transported by compressed air through the nest of tubes and partly to the fluidization gas. The treated ore is withdrawn through a conduit 22.

The supply of fresh ore is carried out from a hopper 23 and a screw-type feeder 11a. Compressed air which is fed in at A and injected at 24 serves to effect the pneumatic transport of the unprocessed ore through a pipe 25 into the nest of tubes 21 in which said ore is preheated and partly dehydrated, then in the direction of the arrows $A_2$ and $A_3$ into a separator 26 so as to be stored in the hopper 5. The pneumatic transfer air is discharged at $E_1$ and $E_2$ and is subsequently recompressed and employed again either for the pneumatic transfer or for the fluidization.

Fuel and combustion air are admitted respectively at $B_1$ and $B_2$ through pipes 27 and 28 and are reheated in heat exchangers by the stream $C_6$ of hot gases which are derived from the reduction stage. In order not to complicate the figure, said exchangers have been illustrated in a simplified manner. The air exchanger and reheater is represented by the coil of the pipe 28 which passes through the top portion of the reduction stage; the fuel exchanger and reheater is represented by the coil 29 which surrounds a portion of the closed circuit of the line 30 which passes at 30a through the top portion of the reduction stage. The said circuit contains an intermediate fluid which serves for the purpose of transporting the heat received by the coil 30a up to the exchanger 29 in which the fuel is reheated. The combustion air arrives through a burner 21 which operates in the interior of the combustion chamber 4 which is located beneath the fluidization grid of the roasting stage. The fuel is fed partly into the burner 31, partly directly into the fluidization bed $F_2$ by means of injectors, one of which is shown at 32.

At the top of the upper stage of the roasting reactor, the stream $C_2$ of gases and smokes is subdivided into two partial streams $E_3$ and $C_3$ for the purpose of discharge and re-use.

Valves $V_1$, $V_2$ make it possible to choose the respective flow rates of said two streams.

The stream $C_3$ is brought in through a pipe 33 to the base of the reduction reactor 13 where said stream is reheated by drawing off a part of the sensible heat of the reduced ore which is fluidized by said stream at $F_4$. The gaseous stream $C_6$, $C_7$ is discharged through a conduit 34.

It is possible by means of such an installation to reduce the power consumption to a value which ranges between 200 and 250 therms for one ton of dry ore having an initial composition as follows: Fe—34% (5.8% of which is bivalent Fe); $CO_2$—4.8%; $SiO_2$—36.7%; $H_2O$—6.5%. The successive processing temperatures are: 300° C. in the partial preheating and dehydration bed $F_1$, 900° C. in the roasting and total oxidation bed $F_2$, 760° C. in the magnetizing reduction bed $F_3$, 300° C. on an average in the heat recovery bed $F_4$.

The gases evolved from the combustion contain approximately 2% free oxygen, thereby permitting the bivalent Fe to be totally oxidized and making it possible to obtain a product having a constant and well defined composition at the outlet of the roasting stage and facilitating the control of the reduction process.

The fluidizaion gases no longer contain free oxygen from the point at which said gases are admitted in the bed $F_1$.

The temperature of the smokes emanating from the installation is of the order of 200° C.

What is claimed is:

1. A process for roasting ore by fluidization comprising the steps consisting of fluidizing the ore with a first stream of hot gases, roasting said fluidized ore to obtain roasted ore; providing a second stream of hot gases from at least a part of said first stream forming fluidized beds with said roasted ore and said second stream of hot gases; injecting reducing products in one of said latter beds to reduce the ore; transferring sensible heat from the ore to the second stream of hot gases; and adjusting separately the rate of flow, the temperature and chemical composition of said two streams of hot gases.

2. The process of claim 1 wherein the roasting of the ore is preceded by a dehydrating heating.

3. The process of claim 1 wherein the hot gases are derived from a combustion chamber.

4. A process of roasting ore, comprising the steps of fluidizing the ore with a first stream of hot gases in a first fluidized bed dehydrating the fluidized ore; carrying said dehydrated ore to a second bed fluidized by said first stream of hot gases, said first stream of hot gases circulating from the second to the first fluidized bed; roasting the ore in said second fluidized bed to obtain roasted ore; withdrawing at least a part of the hot gases which leave said first bed to obtain a second stream of hot gases; carrying said roasted ore to a third bed fluidized by said second stream of hot gases; injecting reducing products into said third bed to reduce the ore; carrying said reduced ore to a fourth bed fluidized by said second stream of hot gases, transferring heat from the roasted ore to said second stream by circulating the latter from the fourth to the third bed so as to cool the ore in said fourth bed; and adjusting separately the rate of flow, the temperature and chemical composition of said two streams of hot gases.

5. The process of claim 1 wherein the reducing products which are injected into said one of said fluidized beds are products of decomposition of a low-boiling gasoline.

6. The process of claim 5 wherein the products of decomposition of a low boiling gasoline are obtained by injecting said low-boiling gasoline directly into one of said fluidized bed.

7. The process of claim 4 wherein the reducing products which are injected into the third fluidized bed are products of decomposition of a low-boiling gasoline.

8. The process of claim 7 wherein the products of decomposition of a low boiling gasoline are obtained by injecting said low boiling gasoline directly into the third fluidized bed.

9. The process of claim 1 wherein a part of the sensible heat of the ore leaving said latter beds is transferred to fresh ore which is supplied to the first fluidized bed.

10. The process of claim 1 wherein at least a part of the gases are discharged, and preheating with said discharged gases the air and the fuel which are employed in a furnace for generating hot gases so as to form the first stream of hot gases.

11. The process of claim 1 wherein the oxidation of the ore is finished during the roasting step by incorporating oxygen in the gases which fluidize the bed for said roasting.

12. The process of claim 4 wherein the oxidation of the ore is finished during the roasting step by incorporating oxygen in the gases which fluidize the bed for said roasting.

References Cited by the Examiner

UNITED STATES PATENTS

| | | | |
|---|---|---|---|
| 2,477,454 | 7/49 | Heath. | |
| 2,965,449 | 12/60 | Jukkola | 75—26 |
| 3,021,208 | 2/62 | Feinman | 75—26 |

FOREIGN PATENTS 731,527   6/55   Great Britain.

BENJAMIN HENKIN, *Primary Examiner.*

BENJAMIN HENKIN, *Examiner.*